United States Patent [19]

Ishida et al.

[11] Patent Number: 5,571,854
[45] Date of Patent: Nov. 5, 1996

[54] PHENOLIC RESIN MOLDING MATERIAL INCLUDING A CRYSTALLINE PHENOLIC COMPOUND HAVING PLURAL HYDROXYPHENYL GROUPS AND A COMPOUND HAVING PLURAL HYDROXYL GROUPS IN A BENZENE RING

[75] Inventors: Tamotsu Ishida, Fujieda; Tsukasa Sakamoto, Kawasaki; Hidenori Saito, Yokohama, all of Japan

[73] Assignee: Sumitomo Bakelite Company Limited, Tokyo, Japan

[21] Appl. No.: 340,903

[22] Filed: Nov. 15, 1994

[51] Int. Cl.⁶ .................. C08J 5/10; C08K 5/13; C08L 61/12
[52] U.S. Cl. .................. 524/342; 524/343; 524/344; 524/345; 524/346; 524/347; 525/504; 528/219
[58] Field of Search .................. 524/342, 343, 524/344, 345, 346, 347, 425, 430; 525/504; 528/219

[56] References Cited

U.S. PATENT DOCUMENTS 5,096,983   3/1992   Gerber .................. 525/505

OTHER PUBLICATIONS

Billmeyer Jr. Fred, Textbook of Polymer Chemistry 1959 Edition, pp. 347–350.

*Primary Examiner*—Paul R. Michl
*Assistant Examiner*—U. K. Rajguru
*Attorney, Agent, or Firm*—Browdy and Neimark

[57] ABSTRACT

A phenolic resin molding material for molding at lower than normal pressures, comprising as resin components a combination of (A) a crystalline phenolic compound having two or more hydroxyphenyl groups and (B) a compound having two or more hydroxyl groups in the benzene ring, or (A), (B) and (C) a phenolic resin.

8 Claims, 1 Drawing Sheet

PHENOLIC RESIN MOLDING MATERIAL INCLUDING A CRYSTALLINE PHENOLIC COMPOUND HAVING PLURAL HYDROXYPHENYL GROUPS AND A COMPOUND HAVING PLURAL HYDROXYL GROUPS IN A BENZENE RING

BACKGROUND OF THE INVENTION

1. Field of the Invention

The present invention relates to a phenolic resin molding material with excellent low-pressure moldability. More particularly, the invention is intended to provide a phenolic resin molding material which scarcely allows formation of flash during injection molding.

2. Related Art Statement

Phenolic resin molding materials are utilized for a wide range of applications such as automobile parts, electronic and electrical parts, machine parts, etc., because of their high heat resistance and excellent electrical and mechanical properties. However, phenolic resin molding materials have the problem that they tend to form flash during molding as compared with thermoplastic resin molding materials. Flash is formed as the molten molding material is forced out from the narrow spaces such as parting face, air vent, etc., of a mold during molding. A great deal of time and labor is required for removing flash from the molded products, so that reduction or inhibition of flash formation in working of the phenolic resin molding materials has been strongly desired.

As a solution to this problem, it has been proposed to blend a powdery filler in the molding material. However, when it is tried to inhibit flash formation by this method, the fluidity of the molding material is deteriorated, causing incomplete filling of the mold cavity with the molding material. It was thus difficult for this method to satisfy both requirements for inhibition of flash formation and perfect filling of the mold cavity with the molding material. Many proposals regarding design of a mold and design and control of a molding machine have been made for the solution of the subject problem, but none of these proposals could give a practical solution to the problem. Low-pressure molding with a low-condensation novolak has also been proposed, but this method had the problem of low curing rate and could hardly be put to practical use.

OBJECT AND SUMMARY OF THE INVENTION

The present invention has been attained as a result of extensive studies for obtaining a phenolic resin molding material which is capable of inhibiting formation of flash during low-pressure molding. The object of the invention is to provide a phenolic resin molding material having very excellent mold filling quality and curing characteristics and capable of inhibiting formation of flash during molding.

The present invention provides a phenolic resin molding material for low-pressure molding, i.e. molding at a pressure lower than required for reliable molding of ordinary phenolic resin, comprising a curing agent and as resin components a combination of (A) a crystalline phenolic compound having two or more hydroxyphenyl groups and (B) a compound having two or more hydroxyl groups in the benzene ring; or (A), (B) and (C) a phenolic resin, which may be capable of curing the combination of (A) and (B).

Figure 1:
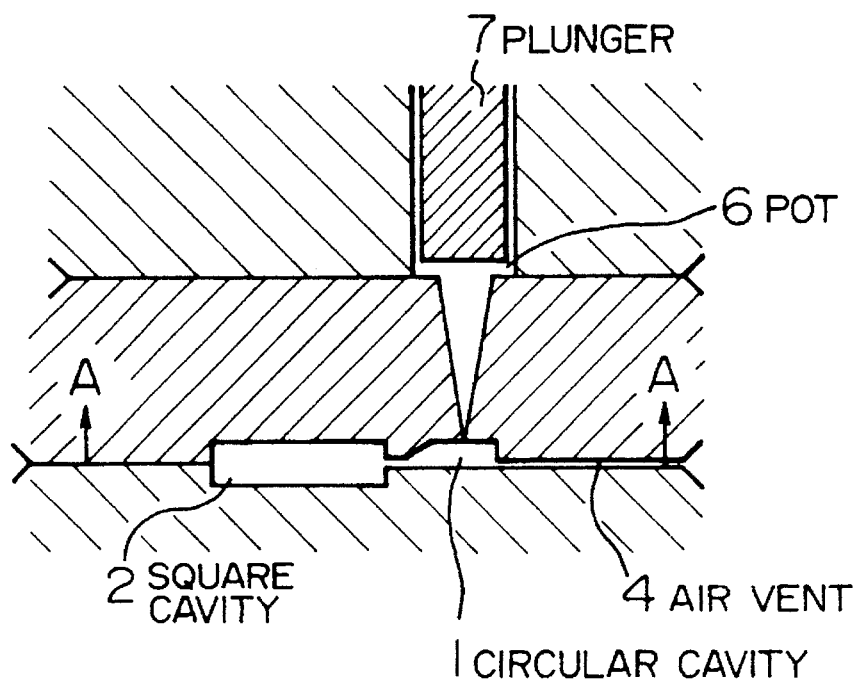
FIG. 1 is a schematic sectional view of the transfer molding mold used in the Examples of the present invention.
Figure 2:
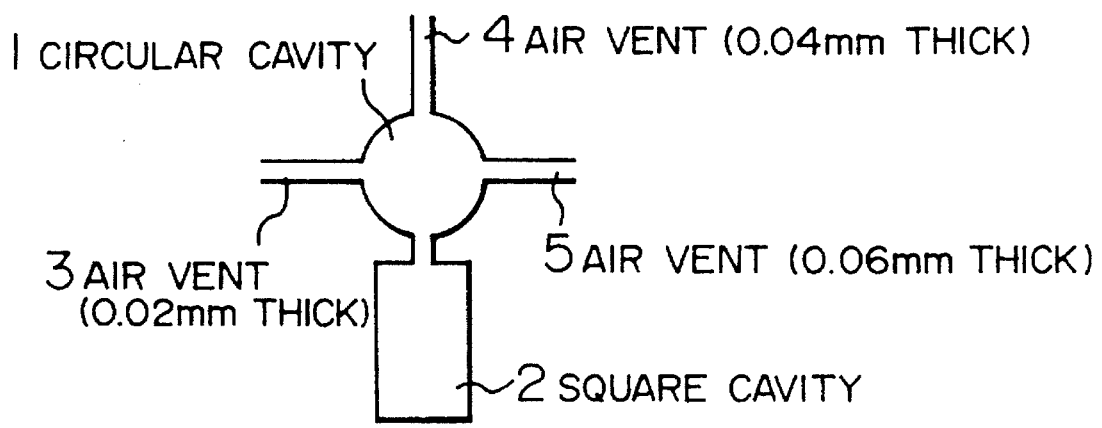
FIG. 2 is a sectional view taken along the line A—A of FIG. 1. The numerals 1–7 in FIGS. 1 and 2 designate the following.

1: circular cavity
2: square cavity
3, 4, 5: air vent
6: pot
7: plunger

DETAILED DESCRIPTION OF THE INVENTION

In the present invention, the "crystalline phenolic compound having two or more hydroxyphenyl groups", represented by (A), is a phenolic compound having two or more hydroxyphenyl groups in the molecule which is crystalline at room temperature, has a definite melting point, becomes a liquid of low viscosity, i.e. lower viscosity than that of ordinary phenolic resin, when melted and is cured after being reacted with a curing agent for a phenolic resin, such as hexamethylenetetramine Examples of such crystalline phenolic compounds having two or more hydroxyphenyl groups include bisphenolic compounds such as bisphenol A, bisphenol F, bisphenol AD, bisphenol Z, bisphenol S and their derivatives, biphenol and its derivatives, and the phenolic compounds having three or four hydroxyphenyl groups represented by the undermentioned chemical formulae. These phenolic compounds may be used either singly or as a mixture of two or more of them.

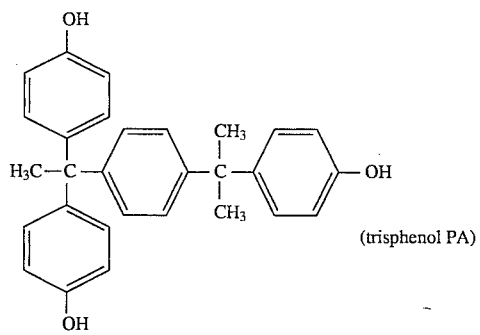

(trisphenol PA)

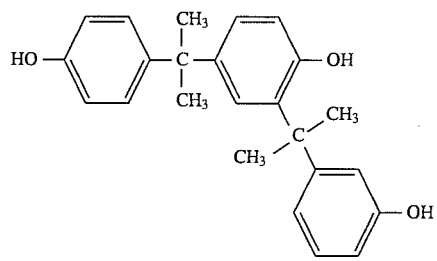

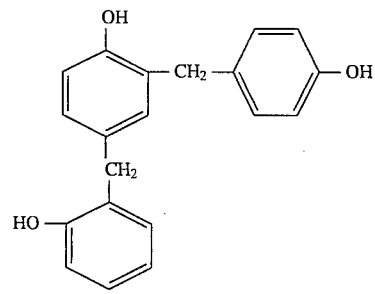

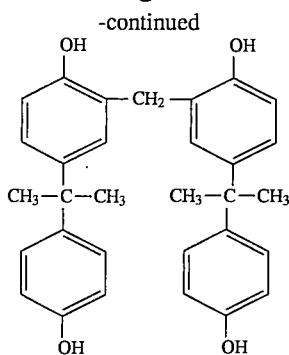
-continued

In the present invention, as the compound having two or more hydroxyl groups in the benzene ring, represented by (B), there can be used, for example, resorcin, hydroquinone, catechol, phloroglucinol, pyrogallol and their derivatives either singly or as a mixture of two or more of them.

As the phenolic resin (C) used in the present invention, ordinary novolak type phenolic resins obtained from reaction of phenols and formaldehyde can be used.

In the present invention, a crystalline phenolic compound (A) having two or more hydroxyphenyl groups is used for providing the phenolic resin molding material with the properties that it is solid at normal temperature, can be melted more rapidly by plasticization during injection molding to become a fluid of low viscosity and is capable of low-pressure molding. A compound (B) having two or more hydroxyl groups in the benzene ring is used for imparting to the molding material the property that it can be cured more rapidly while maintaining low viscosity without impairing said properties of the crystalline phenolic compound. An ordinary novolak type phenolic resin (C) may be used as desired for adjusting viscosity and curing characteristics of the molding material.

Thus, in the present invention, the mixing ratio of the crystalline phenolic compound having two or more hydroxyphenyl groups (A), the compound having two or more hydroxyl groups in benzene ring (B) and the phenolic resin (C) can be suitably selected, but preferably they are mixed in a ratio defined as A/B=97/3–90/10 or (A+C)/B=97/3–90/10 (wherein A/C=10/90–80/20) based on 100 parts by weight of the whole resin components. When the proportion of (A) is too low, the obtained molding material may not have the peculiar property of being crystalline, and when its proportion is too high, curing of the molding material is retarded. Also, a too low proportion of (B) makes it unable to produce the desired curing promoting effect, and a too high proportion thereof makes the molding material uncurable. Regarding the proportion of (C), usually the viscosity of the molten resin increases and the curing characteristics are improved as the quantity of (C) increases, so that the proportions of (A), (B) and (C) may be properly selected within the above-defined range depending on the purpose of use of the produced molding material.

The fillers usable in the phenolic resin molding material of the present invention include organic fillers such as woodmeal, ground pulp, grinds of various types of fabrics, grinds of phenolic resin laminates and molded products, etc., powders of inorganic materials such as silica, alumina, aluminum hydroxide, glass, talc, clay, mica, calcium carbonate, carbon, etc., and inorganic fibers such as glass fiber, carbon fiber, asbestos, etc. These fillers may be used singly or in admixture.

Hexamethylenetetramine is used as a curing agent for the phenolic resin molding material of the present invention.

As for the mixing ratio of the constituents of the phenolic resin molding material of the present invention, the sum of the resin components and the curing agent is 20–70 parts and the filler is 30–80 parts per 100 parts by weight of the whole molding material, and the curing agent is 7–30 parts to 100 parts by weight of the resin components.

The phenolic resin molding material of this invention may contain various types of additives such as mold releasing agent, colorant, curing accelerator, flame retardant, etc.

The phenolic resin molding material of the present invention can be produced by blending said resin components, curing agent, filler and other additives, kneading the mixture by roll mill, double-axis kneader or the like, and grinding the kneaded mixture.

The phenolic resin molding material of this invention has very excellent mold cavity filling qualities and curing characteristics in low-pressure molding. It also shows good moldability with little flash formed during molding and is especially suited for injection molding. These specificities of the phenolic resin molding material of this invention may be accounted for by the fact that the phenolic resin molding material of the present invention is very rapidly melted to form a fluid of low viscosity in the plasticization step of the molding process, so that the molding material can be filled in the mold cavity under low pressure with no need of applying an extra pressure that may cause formation of flash, and is cured rapidly.

DESCRIPTION OF PREFERRED EMBODIMENTS

The present invention is further illustrated with reference to the examples. In the following Examples, all "parts" are by weight unless otherwise noted.

EXAMPLE 1

22 parts of an ordinary novolak resin (average number molecular weight: 800) produced by reacting a phenol with formaldehyde, 19 parts of bisphenol F, 3 parts of resorcin, 10 parts of hexamethylenetetramine, 3 parts of calcium hydroxide, 32 parts of woodmeal, 11 parts of calcium carbonate and 3 parts of a mold releasing agent were mixed, and the mixture was melted and kneaded by a two-roll mill, then cooled and ground to obtain a phenolic resin molding material.

EXAMPLE 2

The procedure of Example 1 was repeated except that 3 parts of phloroglucinol was used in place of resorcin to produce a phenolic resin molding material.

EXAMPLE 3

The procedure of Example 1 was repeated except that 19 parts of bisphenol A was used in place of bisphenol F to produce a phenolic resin molding material.

EXAMPLE 4

20.5 parts of bisphenol F, 20.5 parts of trisphenol PA, 2.5 parts of resorcin, 11 parts of hexamethylenetetramine, 3 parts of calcium hydroxide, 32 parts of woodmeal, 11 parts of calcium carbonate and 3 parts of a mold releasing agent were mixed, and the mixture was treated in the same way as in Example 1 to produce a phenolic resin molding material.

COMPARATIVE EXAMPLE 1

44 parts of an ordinary novolak resin (average molecular weight: 800) obtained by reacting a phenol with formaldehyde, 7 parts of hexamethylenetetramine, 3 parts of calcium hydroxide, 32 parts of woodmeal, 11 parts of calcium carbonate and 3 parts of a mold releasing agent were mixed and the mixture was melted and kneaded by a two-roll mill, then cooled and ground to obtain a phenolic resin molding material.

The viscosities of the resin components used in the Examples and the Comparative Example and the properties of the obtained phenolic resin molding materials are shown in Table 1.

TABLE 1

|  | Example 1 | Example 2 | Example 3 | Example 4 | Comp. Example 1 |
| --- | --- | --- | --- | --- | --- |
| Viscosity of resin components (Pa · s) | | | | | |
| At 150° C. | 0.020 | 0.022 | 0.030 | 0.020 | 5.50 |
| At 170° C. | 0.007 | 0.007 | 0.008 | 0.005 | 1.00 |
| Fluidity (Pa · s) At 150° C. | 102 | 110 | 115 | 91 | 950 |
| Curing characteristics (Barcol hardness) After 40 sec. | 60 | 62 | 60 | 60 | 63 |
| Molding pressure (Kg/cm$^2$) Gauge pressure | 25 | 25 | 25 | 25 | 50* |
| State (degree) of flash formation | Slight | Almost none | Slight | Slight | Heavy |

*Filling was incomplete under 25 kg/cm$^2$

In Table 1, the viscosity of resin components was measured by a high-temperature type cone plate viscometer (Model CCV-1S mfd. by TOA Industry Co., Ltd.). Fluidity of the molding material was represented by melt viscosity measured by a flow tester of capillary rheometer type (model CFT-500C mfd. by Shimadzu Corp.). Curing characteristics were represented by Barcol hardness of the molding material which had been filled in a 175° C. mold after preheated to 105° C. by a transfer molding machine and taken out therefrom after 40-second molding. The state (degree) of flash formation was determined after molding the material by a transfer molding machine under the following conditions. Transfer molding conditions: 20 g of tableted phenolic resin molding material was preheated to about 100° C. and molded by a transfer molding mold of the structure shown in FIG. 1 at 175° C. for 3 minutes. The state (degree) of flash formation was judged by visual observation of flash at the air vents of the mold.

From Table 1, it is seen that the samples of phenolic resin molding material obtained in the Examples of this invention are very excellent in fluidity and curing characteristics and also scarcely allow formation of flash during molding as compared with the conventional phenolic resin molding material taken up here as a comparative example.

As apparent from the above Examples, the phenolic resin molding material according to the present invention can satisfy both requirements for good mold filling qualities and inhibition of formation of flash during molding, so that use of this molding material allows marked reduction of time and labor for after-working of the molded products and it finds a wide scope of use as a phenolic resin molding material with excellent moldability.

What is claimed is:

1. A phenolic resin molding material for low-pressure molding, comprising hexamethylenetetramine as curing agent and as resin components a combination of (A) a crystalline phenolic compound having two or more hydroxyphenyl groups and (B) a compound having two or more hydroxyl groups in the benzene ring, or (A), (B) and (C) a novolak resin.

2. A phenolic resin molding material according to claim 1, wherein the resin components consist of a combination of said compound (A) and said compound (B), and the weight ratio of these compounds (A) and (B) is defined as A/B= 97/3–90/10.

3. A phenolic resin molding material according to claim 1, wherein the resin components consist of a combination of said compound (A), said compound (B) and said novolak resin (C), and the weight ratio of these components (A), (B) and (C) is defined as (A+C)/B=97/3–90/10 and A/C=10/ 90–80/20.

4. A phenolic resin molding material according to claim 1, further comprising at least one additive selected from the group consisting of filler, curing agent, mold releasing agent, colorant, curing accelerator and flame retardant.

5. In a phenolic resin molding composition comprising a curable phenolic material and a hexamethylenetetramine curing agent therefor, the improvement wherein said curable phenolic material is a combination of (A) a crystalline phenolic compound having two or more hydroxyphenyl groups and (B) a compound having a benzene ring containing two or more hydroxyl groups, the weight ratio of (A):(B) being 97:3 to 90:10; and wherein said molding composition optionally contains (C) a novolak partially replacing said crystalline phenolic compound to provide a ratio of (A):(C) of 10:90 to 80:20.

6. A phenolic molding composition according to claim wherein said crystalline phenolic compound (A) is selected from the group consisting of bisphenol A, bisphenol F, bisphenol AD, bisphenol C, bisphenol S and mixtures thereof.

7. A phenolic molding composition according to claim 5 wherein said compound having a benzene ring with two or more hydroxyl groups (B) is selected from the group consisting of resorcin, hydroquinone, catechol, phloroglucinol, pyrogallol and mixtures thereof.

8. A phenolic molding composition according to claim 5 further comprising a filler in an amount of 30–80 parts of 100 parts by total weight of said phenolic molding composition.

* * * * *